June 9, 1931.  E. GIEBE ET AL  1,809,624

RESONATOR

Filed April 21, 1927

INVENTOR
ERICH GIEBE
BY ADOLF SCHEIBE
*Ira J. Adams*
ATTORNEY

Patented June 9, 1931

1,809,624

UNITED STATES PATENT OFFICE

ERICH GIEBE AND ADOLF SCHEIBE, OF CHARLOTTENBURG, NEAR BERLIN, GERMANY, ASSIGNORS TO RADIO CORPORATION OF AMERICA, A CORPORATION OF DELAWARE

RESONATOR

Application filed April 21, 1927, Serial No. 185,429, and in Germany April 24, 1926.

The invention relates to a resonator and more particularly to the use of crystals for the measurement of alternating current frequencies as well as for the control of transmitters of definite frequency, and also for the tuning of wave-meters or receivers to very definite wave-lengths.

It is well known that rods or plates cut out of as homogeneous a quartz crystal as possible can be used for the above object. But the use of such rods or plates involves the inconvenience that apart from a definite fundamental wave and harmonics, there are excited also a number of stray oscillations, and these often occur in great numbers. It sometimes happens that the use of such quartz crystal becomes unsafe on account of such stray oscillations, for instead of the main oscillation, one of the secondary oscillations may be excited. Hence, ways and means must be found to the end to suppress as far as feasible such stray oscillations.

It is an object of this invention to provide a crystalline resonator responsive to substantially only one frequency.

It is a further object of this invention to provide a resonator whose resonance may be determined by luminous effects.

Other objects and advantages of this invention will be apparent as the description thereof proceeds.

Figure 1:
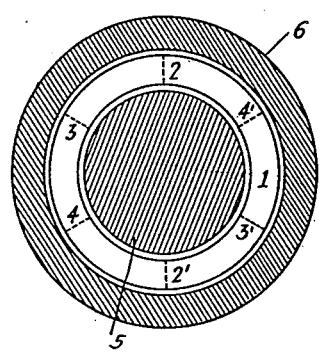
Figure 2:
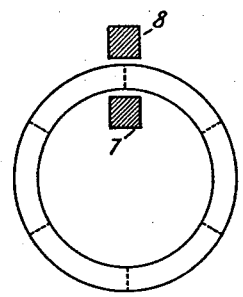

The invention is illustrated by way of example in the accompanying drawings, in which:

Figure 1 shows an annular crystalline member excited by means of two concentric electrodes and, Figure 2 shows such a member wherein the excitation occurs at substantially one point on the annular member.

A crystalline ring 1 is cut out of a plate which in turn has been cut out of a crystal such as a quartz crystal, for example, at right angles to the optical axis. The electrical axes of the quartz ring being displaced by angles of 120 degrees are indicated by 2, 2', 3, 3', and 4, 4'. It will be understood that the plate is preferably cut from the native crystal at right angles to the optical axis, but it may be cut at other angles to said axis without departing from the spirit and scope of this invention.

Now, it can be proved theoretically and experimentally that such a circular ring, in a distinct case of excitation, is able to set up only a single oscillation, to be more precise, an oscillation in which three wave-lengths are distributed around its circumference. It is only in the case of such an oscillation that resonance excitation is feasible. The mode of excitation which is required in order that this only oscillation may be excited is shown in Figure 1. For this purpose, the field must be brought to act radially in all directions upon the circular ring. The inner exciting electrode, for instance, consists of the circle 5, the outer one of the circular ring 6. If between these two electrodes, which are insulated from each other, an alternating potential of such a frequency is set up that just three complete waves can be formed on the circular ring, this vibration will be produced, while the excitation of any other oscillations is impossible in this arrangement.

Apart from perfect distinctness of the excited resonance frequency, this form of resonator offers besides a number of other advantages among which the following ones shall be particularly mentioned. If very short waves shall be produced, say, of a length less than 100 meters, then, when using rods or plates, the length of the quartz rod must be very small or the thickness of the quartz plate very little. But this is undesirable for mechanical reasons inasmuch as, apart from other inconveniences, this very undesirable shape would promote and favor the arising of stray oscillations. Another drawback is that very small quartz rods are hard to work mechanically. Further, the proper holding or securing of such small rods is attended with serious difficulties since damping by the holding means is hardly avoidable. But, in the shape of a circular ring, the excited wave-length is substantially shorter than the dimensions of the ring. These rings are of relatively large proportions where very rapid vibrations are used and these rings therefore, can be more readily worked mechanically and are less subject to the damping action of the holding means.

Another advantageous feature of the special form consists, however, in that, as shown in Figure 2, it is also possible to excite substantially longer waves than are obtainable with the aid of quartz rods or plates. For if, as shown in Figure 2, the quartz ring is not excited on all sides by a radially directed field, but only at one point, for instance, at the passage point of the electrical axes, the ring can be excited in such a way that just one complete wave-length arises about its periphery. This wave-length which is governed by the circumference of the ring, may be far greater than any wave-length attainable with rods; for it will be noted that when using rods, the wave-length is dependent upon the physical length of the quartz crystal. And this length hardly ever exceeds 10 cm. Another fact to be noted is that such rods are very expensive, for quartz crystals having the requisite length in order to furnish an adequately long rod to be cut therefrom are rare. In a ring, on the other hand, it is the mean periphery of the ring that enters in the oscillation formula instead of the length. And since the circumference is roughly three times larger than the diameter, it follows that in this manner three times larger waves are attainable than with a rod.

In Figure 2 the exciting electrodes are indicated by 7 and 8. It goes without saying that instead of a pair of electrodes a greater number thereof can be employed; but in this case, as is well known, proper polarity of coacting electrodes must be given special attention.

The use of an annular quartz crystal as hereinbefore described is possible in all such cases where heretofore rod or plate-shaped crystals have been customarily used. Another feature is that by the arrangement as here disclosed the production or existence of resonance condition can be made perceivable by the arising of luminous actions, as described by applicants in their co-pending United States patent application, Serial No. 114,567, filed June 8, 1926. This offers the additional advantage that the luminous action, in the case of excitation as shown in Figure 1, is far brighter than is true in the case of rod-shaped resonators; for while in the case of the latter, only one or two luminous points are produced, six such points are set up on each side of the ring, to be more precise, at those points where the electrical axes are located.

While the invention has been explained by reference to quartz crystals, it will be understood that the same is applicable also to other kinds of piezo electric crystals.

Having thus described our invention, what we claim is:

1. A piezo-electric resonator having an annular shape.

2. A piezo electric resonator comprising an annular ring cut from a crystal.

3. An annular crystalline resonator and means for applying radially thereto, an electric field.

4. A crystal resonator in the form of a ring, an electrode within said resonator and an electrode outside of said resonator.

5. An annular piezo electric resonator, a pair of electrodes, one within and one without the resonator for exciting the same, said electrodes being arranged so as to render visible luminous phenomena occurring by virtue of the excitation of the resonator.

6. A piezo-electric resonator comprising an annular shaped crystal element having optical and electrical axes, the plane of said annular element being substantially at right angles to said optical axis.

ERICH GIEBE.
ADOLF SCHEIBE.